United States Patent [19]

Ksioszk

[11] 4,011,837
[45] Mar. 15, 1977

[54] SELF-CLEANING ANIMAL KENNEL

[76] Inventor: Leo P. Ksioszk, N98 W15754 School Road, Germantown, Wis. 53022

[22] Filed: Nov. 26, 1975

[21] Appl. No.: 635,688

Related U.S. Application Data

[63] Continuation-in-part of Ser. No. 550,964, Feb. 19, 1975, abandoned.

[52] U.S. Cl. .................................... 119/1; 119/19
[51] Int. Cl.² ........................................ A01K 1/02
[58] Field of Search .................. 119/1, 17, 22, 19

[56] References Cited

UNITED STATES PATENTS

| | | | |
|---|---|---|---|
| 2,039,783 | 5/1936 | Ebeling | 119/1 |
| 2,565,521 | 8/1951 | Ratermann | 119/22 |
| 3,585,968 | 6/1971 | Stone, Jr. | 119/22 |

Primary Examiner—Hugh R. Chamblee
Attorney, Agent, or Firm—Andrus, Sceales, Starke & Sawall

[57] ABSTRACT

An animal kennel having a provision for automatically disposing of animal waste. An impervious sheet is moved along the floor of the kennel and is adapted to collect the animal waste, and after leaving the kennel, a sheet of absorbent paper is applied over the waste on the impervious sheet and deodorant is applied to the absorbent paper. The side edges of the composite sheet are then folded inwardly and the composite sheet is rolled in coiled form on a collection drum while pressure is applied to the sheet to compact the waste. The movement of the sheet through the kennel can be actuated by a sensing mechanism which senses the presence of an animal in the kennel.

9 Claims, 4 Drawing Figures

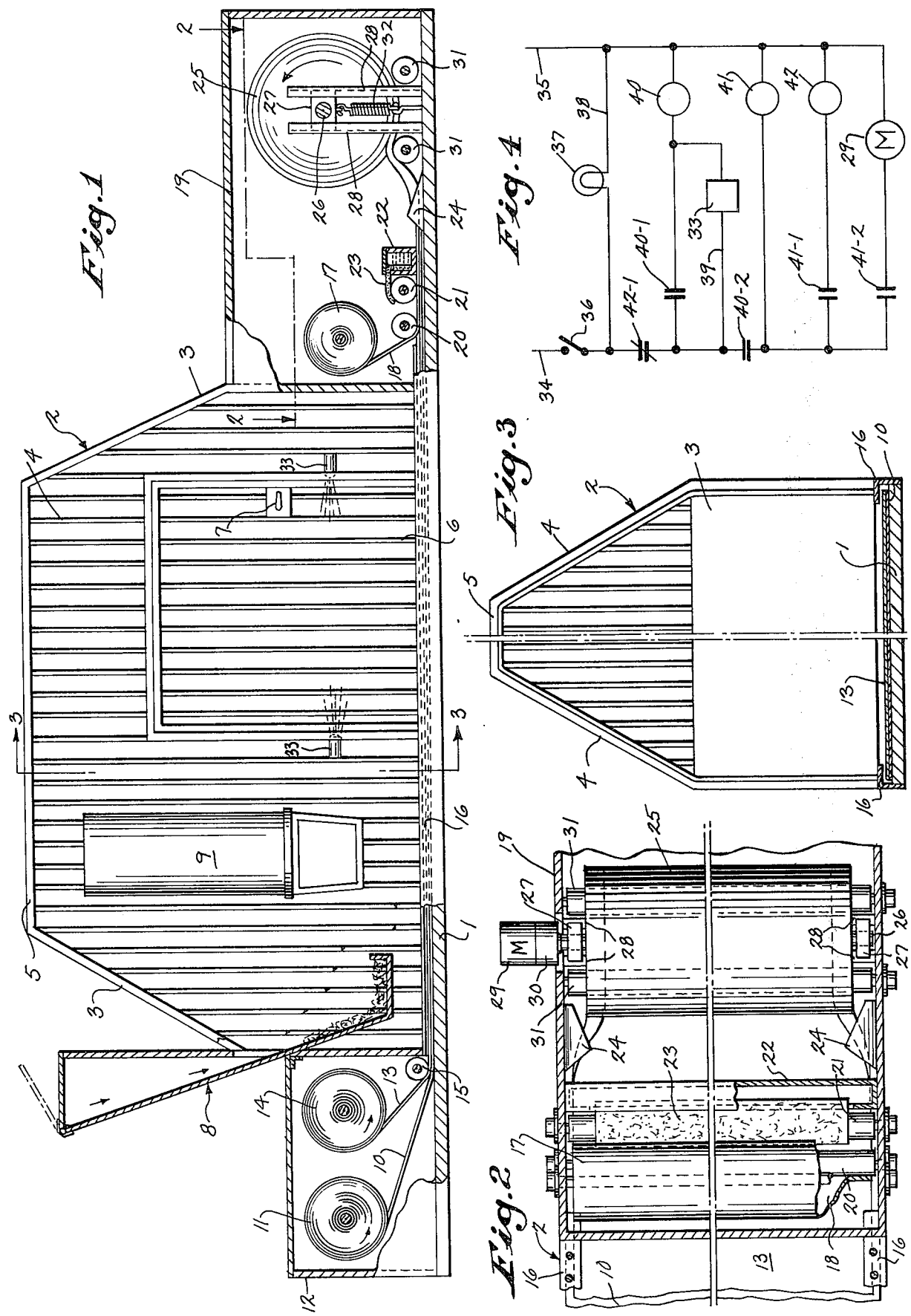

SELF-CLEANING ANIMAL KENNEL

This application is a continuation-in-part of an application Ser. No. 550,964, filed Feb. 19, 1975, now abandoned.

BACKGROUND OF THE INVENTION

Various devices have been used in the past for automatically collecting and disposing of animal waste. In some cases, the animal cages have been mounted above a conveyor, and the waste products are deposited on the conveyor and automatically removed from the area of the cage to a collection site. However, these devices as used in the past have been unsatisfactory for use with household pets, such as dogs and cats, because they were not completely sanitary and odor-free.

SUMMARY OF THE INVENTION

The invention relates to a device for automatically disposing of the waste of animals, such as household pets. In accordance with the invention, an impervious paper sheet is positioned on the floor of a kennel or cage and is adapted to receive the waste from the animal. After a predetermined time period, the sheet containing the waste is drawn from the kennel and a sheet of absorbent paper is applied to the impervious sheet and covers the animal waste. A deodorant material is applied to the absorbent sheet.

The side edges of the composite sheet structure are then folded inwardly and the composite sheet structure is then wound in coiled form on a collection drum or reel. The drum which contains the coiled composite sheet structure is urged against a pair of cooperating rolls to flatten and compact the waste material located between the coiled sheets, and the folded side edges of the sheets prevents the waste material from being squeezed out of the side edge portions of the composite structure.

The movement of the sheet beneath the kennel is automatically controlled by a sensing mechanism. When the animal enters the kennel or cage, the sensing mechanism is actuated which activates a timer. When the timer times out after a period of several minutes, the collection drum is rotated to draw the sheet through the kennel in the manner previously described.

The device of the invention provides for the automatic collection and disposal of animal waste and the operation can be automatically actuated by the animal itself, so that manual attendance or operation is not required.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the animal kennel of the invention which parts broken away in section;

FIG. 2 is a fragmentary top view of the structure as shown in FIG. 1;

FIG. 3 is a section taken along line 3—3 of FIG. 1; and

FIG. 4 is a wiring diagram.

DESCRIPTION OF THE PREFERRED EMBODIMENT

FIGS. 1–3 illustrate a kennel for a small animal, including a base 1, and a cage 2 which is supported on the base. The cage 2 is provided with sloping end walls 3 and side walls 4, which are connected by a top 5. The sloping contour of the end walls and side walls tend to keep the animal away from the walls and near the center of the cage.

The cage 2 is provided with a doorway which can be enclosed by an upwardly sliding door 6 that can be locked through use of a handle operated locking mechanism 7.

An automatic feeding device 8 can be located in one of 5 the end walls 4 and is adapted to contain a supply of feed for the animal which will automatically be dispensed into the troughlike lower portion of the feeding mechanism. Similarly, an automatic watering device 9 can be mounted on the cage to provide water for the animal.

In accordance with the invention, a sheet of paper 10, is mounted on a roll or drum 11, the shaft is which is journalled between the side walls of a housing 12 that extends outwardly from one of the end walls 3. A water-impervious paper sheet 13 is wound in a roll 14 which is also journalled between the walls of the housing 12. A suitable tensioning mechanism, not shown, can be utilized with the rolls 11 and 14 to provide tension on the sheeting material and prevent it from freely unwinding from the rolls.

The sheets 10 and 13 pass beneath a roll 15 located adjacent the base 1, and the superimposed sheets then travel along the base 1, with the side edges of the sheets being guided within guideways 16, located above the base at the bottom of the side walls 4.

Located at the opposite end of the cage is a roll 17 which contains coiled sheet 18 of absorbent paper. The shaft of the roll 17 is journalled between the side walls of the housing 19 and the absorbent sheet 18 is passed beneath a roll 20 in conjunction with the sheets 10 and 13 and is adapted to cover over any waste material deposited on the sheet 13 by the animal located in the cage.

A liquid deodorant material is adapted to be applied to the upper surface of the absorbent sheet 18 through use of a roll applicator 21. The deodorant liquid is contained within a trough 22 and a fibrous wicking material 23 extends downwardly into the trough and rides on the surface of the roll 21, which is journalled between the side walls of housing 19. The roll 21 is adapted to be rotated by the movement of the composite sheet and the deodorant materials is applied through the wick 23 to the roll 21 and, in turn, is applied to the upper surface of the absorbent sheet 18.

After applying the deodorant to the upper surface of the absorbent sheet, the composite sheet is passed through a pair of edge folding units 24 which act to fold the side edges of the composite sheet inwardly. The sheet with the folded edges is then wound on a collection drum 25 having a shaft 26 that is journaled within bearing assemblies 27. The bearing assemblies 27 are mounted for vertical movement between spaced guide columns 28, as best shown in FIG. 1.

The drum 25 is rotated to draw the sheets from the respective rolls by means of a motor 29 which is connected through a gear reduction unit 30 to the shaft 26 of the drum. The motor 29 and reduction unit 30 are carried by shaft 26, so that the drum 25 and the drive system can move vertically in guide columns 28.

Springs 32 are connected between each of the bearing assemblies 27 and the base 1 of the structure and urge the bearings and drum 25 downwardly against rolls 31 which are mounted between the side walls of housing 19. As the composite sheet is wound on the drum 25 any waste material located between the sheets is compacted or compressed by the action of the drum 25 operating against the rolls 31. The rolls 31 serve the added function of sealing the composite sheet against the previously wound convolutions of the composite sheet on drum 25 to thereby prevent any waste material or odors from escaping from the wound structure. As the composite sheet structure is wound on drum 25, the diameter of the wound coil will become progressively larger, and the drum and drive system can move upwardly within the guides 28 to accommodate the increased diameter.

The drum 25 is operated by a sensing mechanism to draw the paper sheets through the kennel. The sensing mechanism is one that will sense the presence of the animal in the kennel and may take the form of a photoelectric eye unit 33, which is positioned within cage 2 across the doorway and the animal, when it enters the cage, will break the beam to thereby actuate the control circuit to start operation of the motor 29 after a pre-determined time period. Alternately, the sensing mechanism can take the place of a wand-operated switch which is located in the doorway and which would be pivoted or actuated by entry of the animal into the kennel.

The wiring diamgram is illustrated in FIG. 4. Lines 34 and 35 are connected to a suitable source of power and an "on" – "off" switch 36 is connected in line 34, while a light 37 is located in line 38 connected across the lines 34 and 35 and will be lighted when the switch 36 is closed and indicates the power is on.

The photoelectric unit 33 is a type having normally closed contacts which are held open when the eye is illuminated or the beam is unbroken, and the unit 33 is located in line 39 in series with a relay 40 and when the beam is broken by entry of the animal into the cage, the relay 40 will be energized to thereby close the contacts 40-1 and 40-2. Closing of contacts 40-1 will latch in the relay, while closing of contacts 40-2 will energize a timer 41. During the period that the timer 41 is timing out, the animal in case 2 will deposit its waste on the stationary sheet 13 located on base 1. When the timer, which is set for a period of perhaps 3 minutes, times out, contacts 41-1 and 41-2 are closed. Closing contacts 41-1 will energize a second timer 42, while closing the contacts 41-2 will supply power to the motor 29 to drive the wind-up drum 25. Rotation of the wind-up drum will cause the paper on rolls 11, 14 and 17, to be drawn toward the wind-up drum, and thus the waste deposited by the animal in the cage will be covered with absorbent paper 18, deodorized, and rolled into the drum 25.

When the second timer 42 times out, after a period of time sufficient to draw the paper sheets through the cage and to wind them on the drum, the contacts 42-1 will open to thereby shut off power to the motor.

The timers 41 and 42 are adjustable so that they can be set for the desired time periods, which depend, in part, on the habits of the animal.

The motor 29 for drum 25 can also be equipped with a manual on-off switch which can be manually operated for training of the animal, in which case the control circuit shown in FIG. 4 would not be utilized.

The apparatus of the invention provides a self-cleaning kennel in which the waste material deposited on the paper 13 is automatically deodorized, and wound in coiled form on a wind-up drum. As the side edges of the papers are folded over, the coiled material can be compacted to flatten the waste material without danger of the waste being extruded or squeezed from the side edges of the paper. The rollers 31, in conjunction with the folded side edges, provide a seal for the coiled composite structure to provide a completely sanitary and odor proof unit.

Automatic control of the unit is incorporated so that the entry of the animal into the cage will actuate the mechanism to draw the paper onto the wind-up drum.

Various mode of carrying out the invention are contemplated as being within the scope of the following claims particularly pointing out and distinctly claiming the subject matter which is regarded as the invention.

I claim:

1. An apparatus for collecting and disposing of animal waste, comprising a base supply means disposed at one end of the base for supplying an imprevious sheet to the base, said sheet being mounted for movement across the base and disposed to receive waste from an animal, means disposed at the opposite end of the base for applying a sheet of absorbent material to the upper surface of the impervious sheet to cover said animal waste and provide a composite sheet structure, edge folding means for folding the side edges of the composite sheet structure inwardly, winding means for winding the composite sheet structure into coiled form, and means associated with said winding means for applying pressure to the coiled composite sheet structure to thereby compress said waste material, said folded edges acting as dams to prevent the waste material from being squeezed from the side edges of the composite sheet structure.

2. The apparatus of claim 1, and including sensing means for sensing the presence of an animal on said base and operating said winding means, said sensing means including time delay means for delaying operation of said winding means a predetermined time after said sensing means senses the presence of said animal.

3. The apparatus of claim 2, and including a cage mounted on the base and having a doorway therein, said sensing means being located adjacent said doorway.

4. An apparatus for receiving and disposing of animal waste, comprising a base, a cage supported on the base, a supply coil of water impervious sheet material located outside of said cage, guide means associated with said base for guiding the sheet in movement across said base, said animal adapted to deposit waste material on the sheet disposed on said base, a wind-up drum located outside of the cage on the opposite side of the cage from said supply coil, means located between the cage and the wind-up drum for applying a sheet of absorbent paper over said sheet material to cover said waste material and provide a composite sheet structure, edge folding means located between said last named means and the windup drum for folding the side edges of the composite sheet structure, drive means for rotating said drum to wind the composite sheet structure on said drum, and compaction means associated with the drum for applying pressure to the wound composite sheet structure to thereby compact the waste, said folded edges serving as dams, to prevent the waste material from being squeezed from the side edges of the composite sheet.

5. The apparatus of claim 4, and including sensing means for sensing the presence of an animal in said cage for operating said drive means, said sensing means including timedelay means for delaying operation of said drive means a predetermined time after the presence of an animal is sensed in said cage.

6. The apparatus of claim 4, wherein said compaction means comprises a roller disposed to ride against the wound composite sheet structure on said drum, and biasing means for urging said roller and said wound composite sheet structure into contact with each other.

7. An apparatus for collecting and disposing of animal waste, comprising a base structure, an impervious sheet disposed on the base and adapted to receive waste from an animal, said sheet being mounted for movement across the base, means for applying a sheet of absorbent material to the upper surface of the impervious sheet to cover said waste and provide a composite sheet structure, deodorizing means for applying a deodorizing material to the outer surface of the absorbent sheet, edge folding means for folding the side edges of the composite sheet structure inwardly, and winding means for winding the composite sheet structure into coiled form.

8. The apparatus of claim 7, wherein said deodorizing means comprises a roller to ride against the outer surface of the absorbent sheet, and supply means for supplying a liquid deodorizing material to said roller.

9. The apparatus of claim 7, and including sealing means disposed transversely of the direction of movement of said impervious sheet and disposed to bear against the coiled composite sheet structure.

* * * * *